United States Patent [19]
Matsko et al.

[11] Patent Number: 5,483,408
[45] Date of Patent: Jan. 9, 1996

[54] OVERCURRENT TRIP UNIT WITH SEPARATELY ADJUSTABLE NEUTRAL PROTECTION

[75] Inventors: Joseph J. Matsko, Beaver; Joseph C. Engel; Alan B. Shimp, both of Monroeville, all of Pa.

[73] Assignee: Eaton Corporation, Cleveland, Ohio

[21] Appl. No.: 218,008

[22] Filed: Mar. 25, 1994

[51] Int. Cl.$^6$ ...................................................... H02H 3/16
[52] U.S. Cl. ................... 361/94; 361/47; 361/97
[58] Field of Search ................... 361/44, 47, 48, 361/96, 97, 94

[56] References Cited

U.S. PATENT DOCUMENTS

| | | | |
|---|---|---|---|
| 4,631,625 | 12/1986 | Alexander et al. | 361/94 |
| 4,752,853 | 6/1988 | Matsko et al. | 361/94 |
| 5,270,898 | 12/1993 | Elms et al. | 361/96 |

*Primary Examiner*—Todd DeBoer
*Attorney, Agent, or Firm*—Martin J. Moran

[57] ABSTRACT

A circuit interrupting device provides for operator selection of protection parameters for a neutral conductor separate from operator selected phase protection.

13 Claims, 12 Drawing Sheets

OVERCURRENT TRIP UNIT WITH SEPARATELY ADJUSTABLE NEUTRAL PROTECTION

BACKGROUND OF THE INVENTION

1. Field of the Invention

This invention relates to overcurrent trip units for circuit breakers, and more particularly to such trip units providing protection for the neutral conductor which is adjustable separately of the line protection functions.

2. Background Information

In three-phase electric power systems servicing normal, balanced loads, no current, or minimal current, flows in the neutral conductor. However, in installations where single phase loads draw current from a three-phase supply substantial currents can be generated in the neutral conductor which can cause overheating. Such neutral conductor overheating can be caused by inexpensive power supplies used in some computers. Such loads can generate a third harmonic on the neutral conductor having an amplitude which is the square root of 3 times the line current. In new installations, the neutral conductor can be sized to accommodate such neutral currents. However, in many older installations in which the wiring is no longer easily accessible, the neutral conductor may typically be one-half the size of the phase conductors.

In the United States, codes do not permit opening the neutral conductor However, interruption of current in all of the phase conductors terminates neutral current. While separable contacts are not provided in the neutral conductor, some circuit breakers monitor neutral current and trip upon detection of selected neutral overcurrent conditions. Typically, the sensed neutral current is auctioneered along with the phase currents with desired scaling of neutral current relative to the phase currents being fixed by selection of the per unit value of the current transformer sensing neutral current relative to the per unit values of the current transformers sensing phase current. Such fixed scaling is set at the factory and is not easily changed.

There is a need for a circuit breaker trip unit with neutral protection which is operator adjustable separate from the phase protection. This would allow a single model of a circuit breaker to be easily adapted in the field to be used, for instance, with an installation in which the neutral conductor is one/half the size of the phase conductors, or an installation in which the neutral conductor is twice the size of the phase conductor. Preferably, this separately adjustable neutral protection would include long delay trips, short delay trips and instantaneous trips.

SUMMARY OF THE INVENTION

These needs and others are satisfied by the invention which is directed to a circuit breaker trip unit providing neutral protection which is operator adjustable separately from the phase protection. In the preferred embodiment of the invention, this separate neutral protection is selectable as a percentage, which may be greater or less than 100%, of the phase protection. More particularly, the pick-up currents for the long delay, short delay and instantaneous protection for the neutral conductor are selected as a percentage of the long delay, short delay and instantaneous pick-up currents for the phase currents. In a circuit breaker where the pick-up currents for the phase protection functions are adjustable as a first factor times the rated current for the circuit breaker, the pick-up currents for the neutral protection functions are selected as a second factor times the rated current. The time intervals for the long and the short delays for phase protection are used for the neutral protection. In the exemplary embodiment of the invention, the neutral current is scaled by the ratio of the first factor to the second factor and then auctioneered with the phase currents, with the protection algorithms only mn on the largest of the auctioneered currents.

As another aspect of the invention, a neutral overload alarm is actuated when a high load threshold level, which is less than the pick-up current for the neutral long delay protection, is exceeded.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
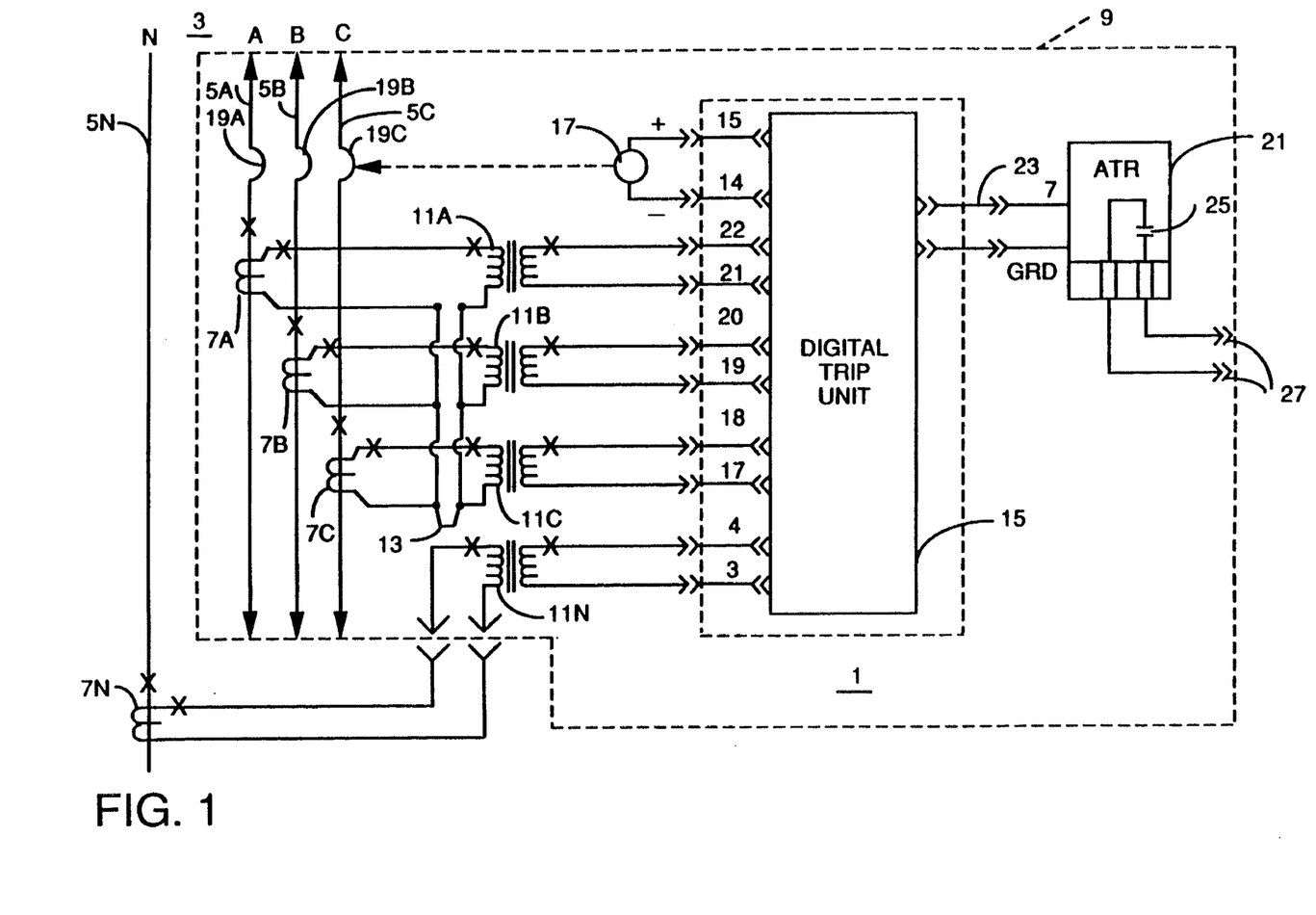
FIG. 1 is a schematic circuit diagram, partially in block diagram form of a circuit interrupter incorporating the invention.

FIG. 1 illustrates a circuit breaker 1 in accordance with the invention connected to provide protection for a three-phase/four-wire electrical system 3. This electrical system has three-phase conductors 5A, 5B, and 5C and a neutral conductor 5N. The circuit breaker 1 has three primary current transformers 7A, 7B, and 7C for sensing current flowing in the respective phase conductors. These primary CT's are physically located inside the housing 9 of the circuit breaker 1. A fourth primary current transformer 7N, external to the circuit breaker 1, monitors current flowing in the neutral conductor 5N. The primary CT's 7 are selected so that the full scale rated current of the electrical system generates on the secondary a 5 ampere signal, for instance. All of the phase primary CT's, 7A–C, are the same size; however, the neutral primary CT 7N can be a different size depending upon the relative size of the neutral conductor 5N to the size of the phase conductors 5A–C. The auxiliary current transformers 11A, B, C, N step down the full scale rated current to, for example, 0.1 amperes. The secondaries of the primary phase CT's are connected at 13.

The two wire outputs of the secondary windings of the current transformers 11A, B, C, N are applied as inputs to a digital trip unit 15. The digital trip unit 15 which is described in FIGS. 3A–3F performs protection functions based on the monitored phase and neutral currents. These protection functions include generating trip signals which actuate a flux shunt trip device 17 to open separable contacts 19A, 19B, and 19C in the phase conductors 5A–C. Where applicable codes permit, a set of contacts (not shown) can also be included in the neutral conductor 5N if desired.

The circuit breaker 1 can also include a relay 21 which may be used for generating a neutral alarm in accordance with the invention. The relay 21 is actuated by a signal on the lead 23 from the digital trip unit 15. The relay 21 closes a set of contacts 25 which provides a contact closure indication at output terminals 27. These terminals 27 may be connected to a remote indicator (not shown). The neutral alarm is generated when current in the neutral conductor exceeds a high load threshold.

Figure 2:
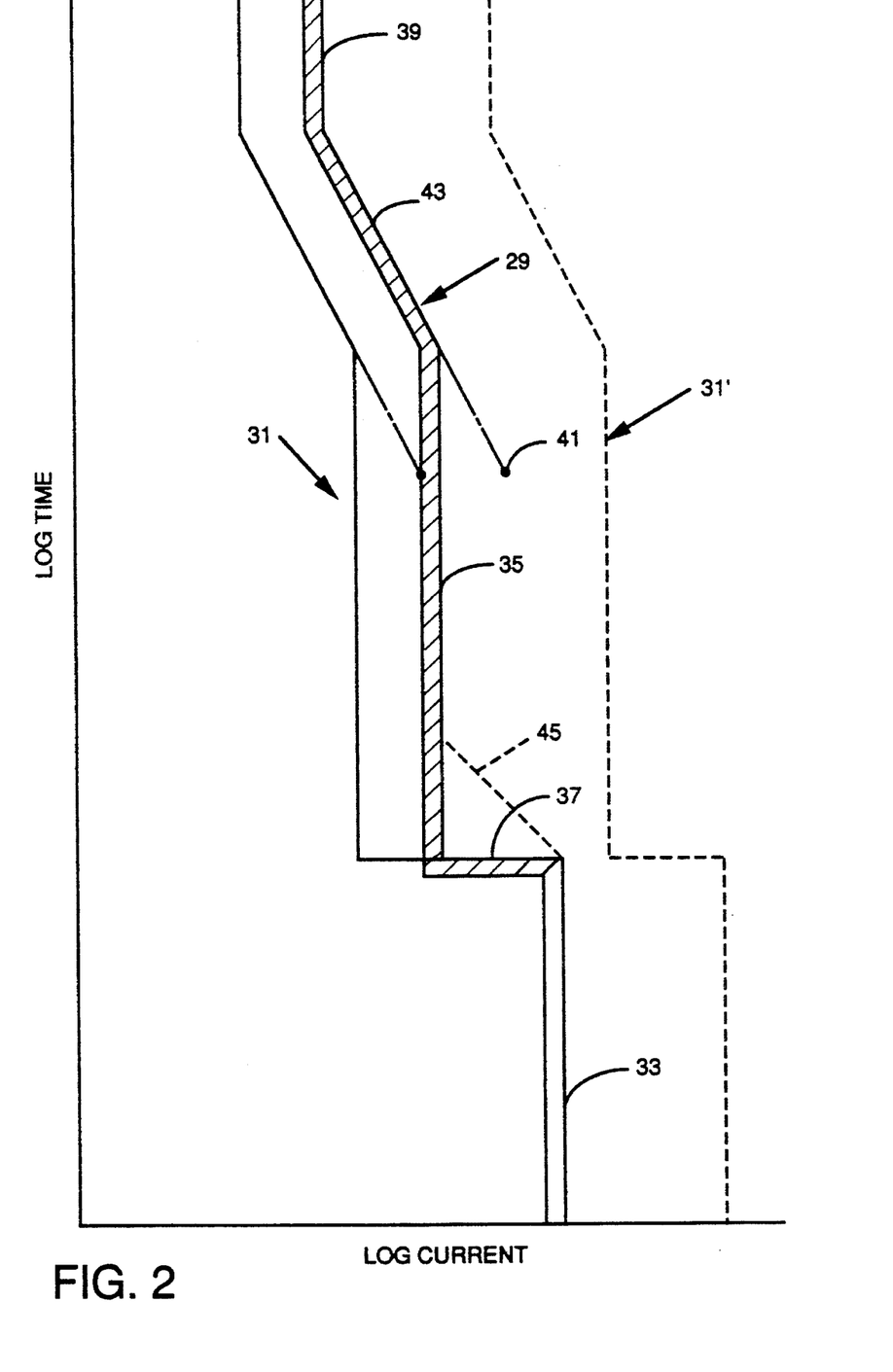
FIG. 2 is a graphical representation of the current-time characteristic of the circuit breaker of FIG. 1 in accordance with the invention.

FIG. 2 is a logarithmic plot of an exemplary current-time protection characteristic of the circuit breaker 1 in accordance with the invention. Current is plotted on the abscissa and time on the ordinate. The fight hand curve 29 is the phase protection curve and the left hand curve 31 is the neutral protection curve. The farthest right vertical portion 33 of the phase curve 29 establishes the instantaneous trip current for the phase conductors. This instantaneous trip function provides protection against short circuits in the phase conductors. Typically, the circuit breaker 1 would be used in an electrical system with other circuit breakers. The short delay trip function allows coordination with other circuit breakers in the system, as is well known. The short delay trip is generated if current exceeds a pick-up value determined by the vertical section 35 of the curve 29 for an interval determined by the horizontal line 37.

The circuit breaker 1 also provides long delay protection. The long delay function provides protection from overheating of the conductors of the electrical system due to persistent excessive current. Typically, long delay protection is selected so that a trip is initiated if a current which is six times a long delay pick-up current level persists for a selected period of time. The long delay pick-up current value is represented by the vertical line segment 39 in FIG. 2. The selected time for the long delay trip is indicated by the time value at the point 41. As the purpose of the long delay trip is to protect against overheating of the electrical system, an $I_2t$ function which approximates the thermal condition of the electrical system is commonly used for long delay protection and is represented by the diagonal portion 43 of the curve 29. It can be appreciated from FIG. 2 that a current which exceeds the long delay pick-up value will result in an earlier long delay trip and is represented by the time value derived from the diagonal portion 43 of the curve 29 corresponding to the higher current. In some installations, an $I^2t$ function is also used for a short delay and is represented by the diagonal dotted line segment 45 in FIG. 2. In the example shown in FIG. 2, the short delay protection overlaps the long delay protection as indicated by the vertical line segment 35 intersecting the diagonal line segment 43 above and to the left of the point 41. As will be seen later, in the explanary circuit breaker separate switches are provided for setting the phase instantaneous pick-up current and the phase long delay pick-up. A separate switch is also provided for setting the phase short delay pick-up current; however it is set as a factor times the long delay pick-up current and is therefore dependent thereon. This dependence is indicated by the stripped portion of the curve 29.

In accordance with the invention, separate operator setable protection is provided for the neutral conductor. In the preferred embodiment of the invention, instantaneous, short delay and long delay protection are provided for the neutral conductor. In the exemplary embodiment of the invention, the pick-up values of current for the instantaneous, short delay and long delay neutral protection are scaled to the pick-up values for phase protection. Furthermore, in the exemplary trip unit 15 the time delays for short delay and long delay for phase protection are also used for neutral protection. Therefore, the curve 31 representing the protection characteristic for the neutral conductor is merely shifted horizontally by an amount related to the scaling factor. The dotted curve 31' shows that the neutral protection curve can be shifted to the right of the phase protection curve, as where the neutral conductor is larger than the phase conductors. As the reason for providing separate operator selectable neutral protection is to accomodate for the fact that the size of the neutral conductor can vary relative to the size of the phase conductors, providing for a single adjustment which scales the neutral protection to that of the phase protection is desirable. Typically, the same factors which dictate the selection of the time interval and the pick-up values for the phase conductors will be applicable to the neutral conductor, and this single adjustment allows a simple correction for the relative size of the neutral conductor. It is to be understood, however, that separate times and different relative pick-up values for instantaneous, short delay and long delay pick-ups could be used for the neutral protection.

Figure 3:
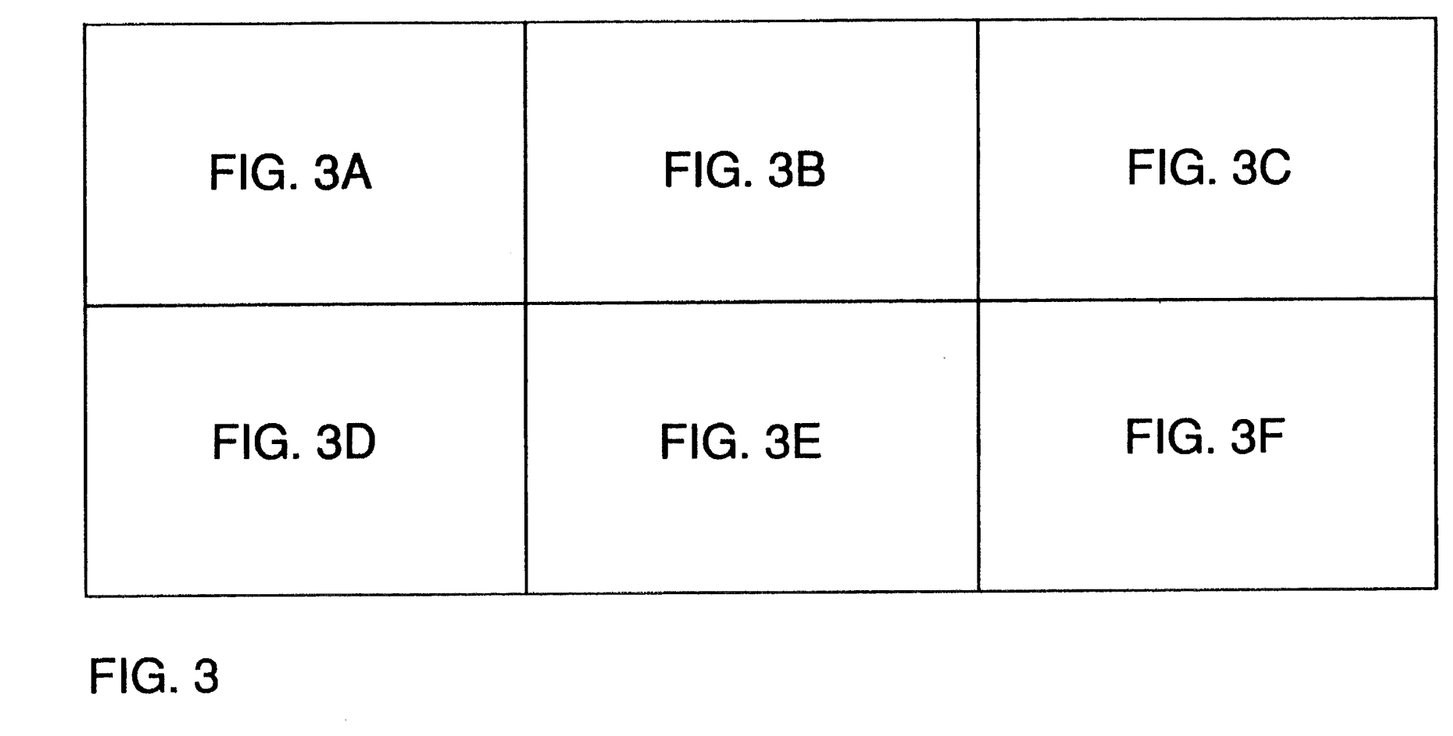
FIG. 3 shows the arrangement of FIGS. 3A–3F.
Figure 3A:
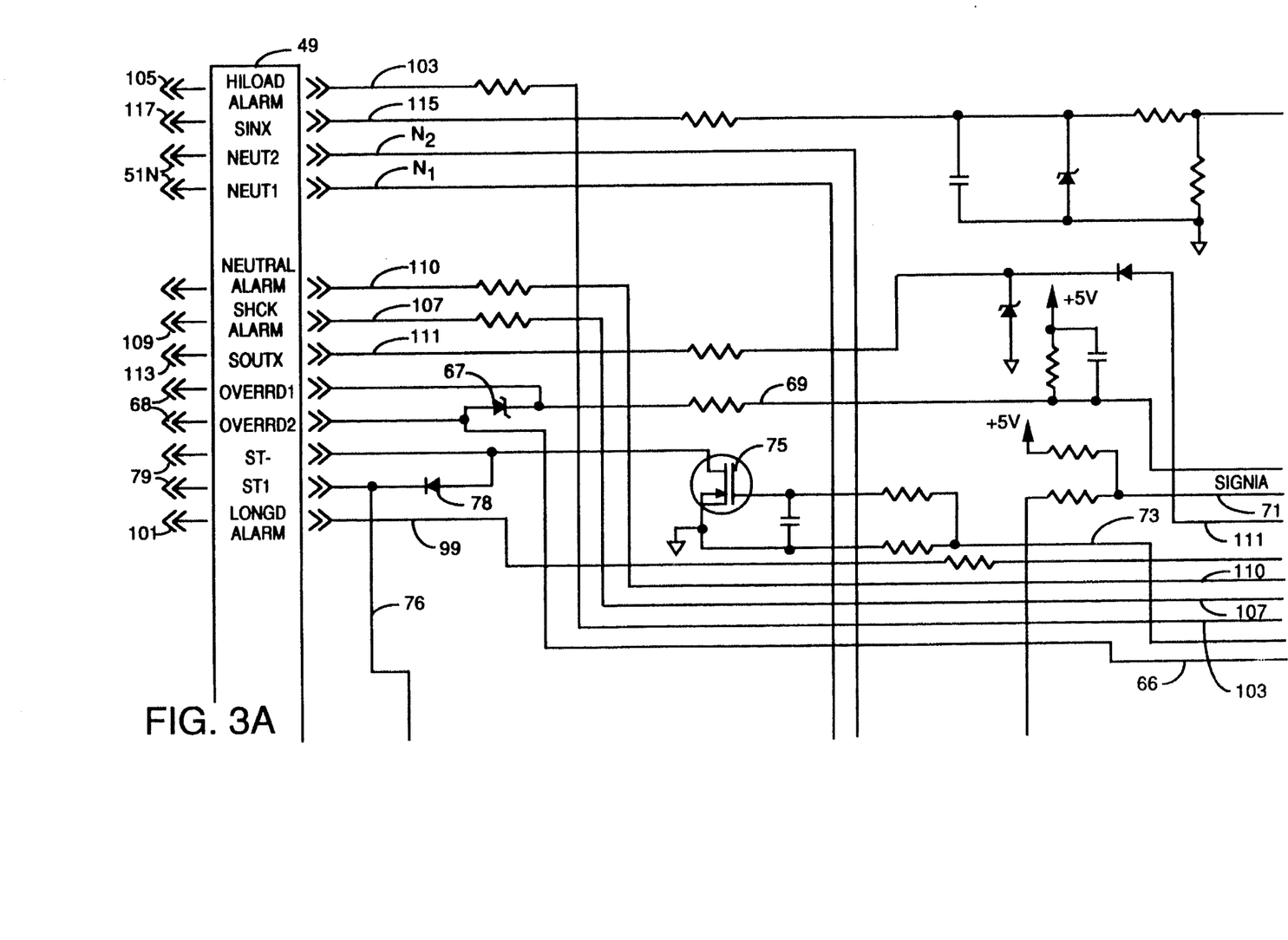
FIGS. 3A–3F, when arranged as shown in the diagram of FIG. 3, form a schematic circuit diagram of the trip unit which forms part of the circuit breaker of FIG. 1.
Figure 3B:
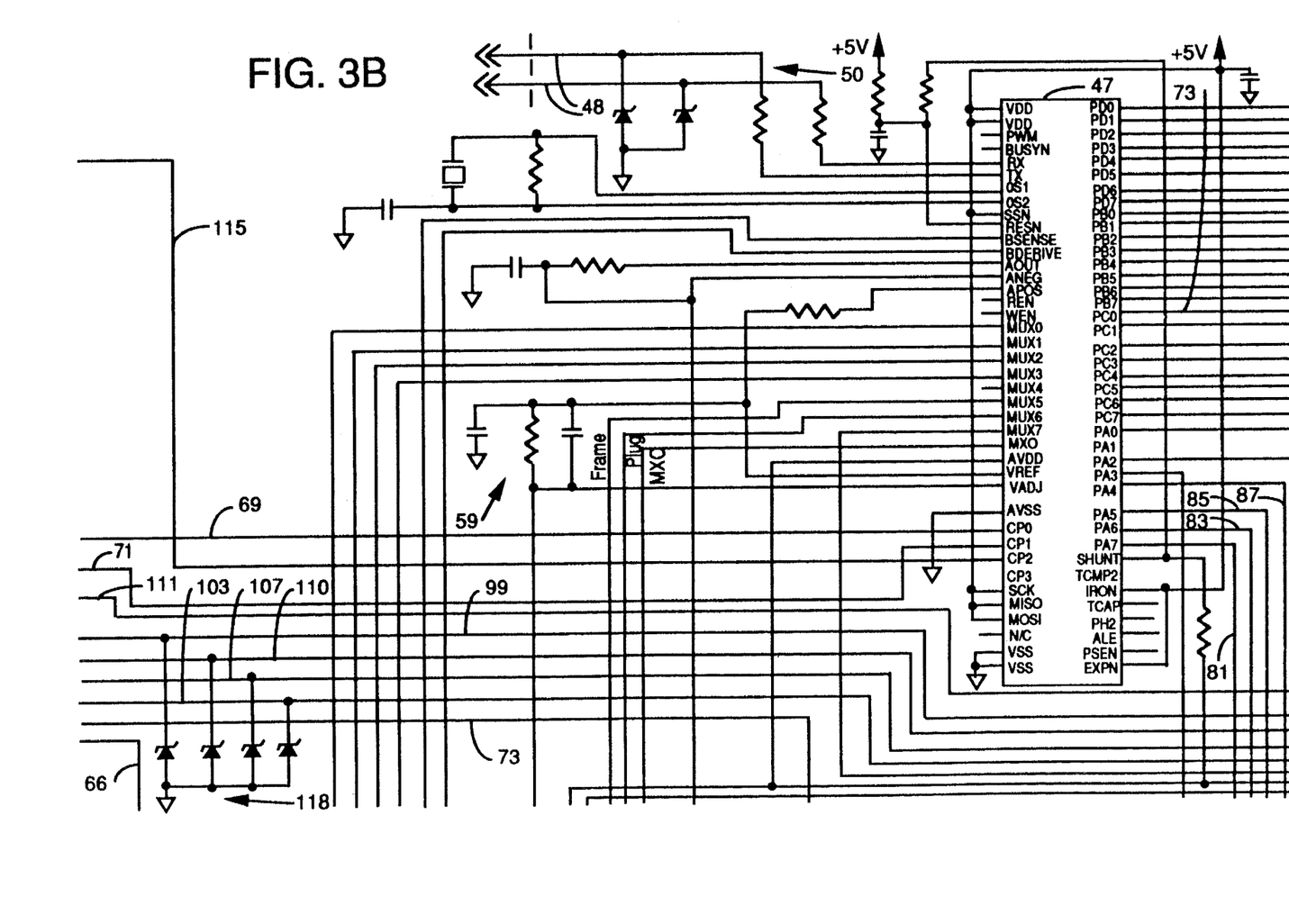
Figure 3C:
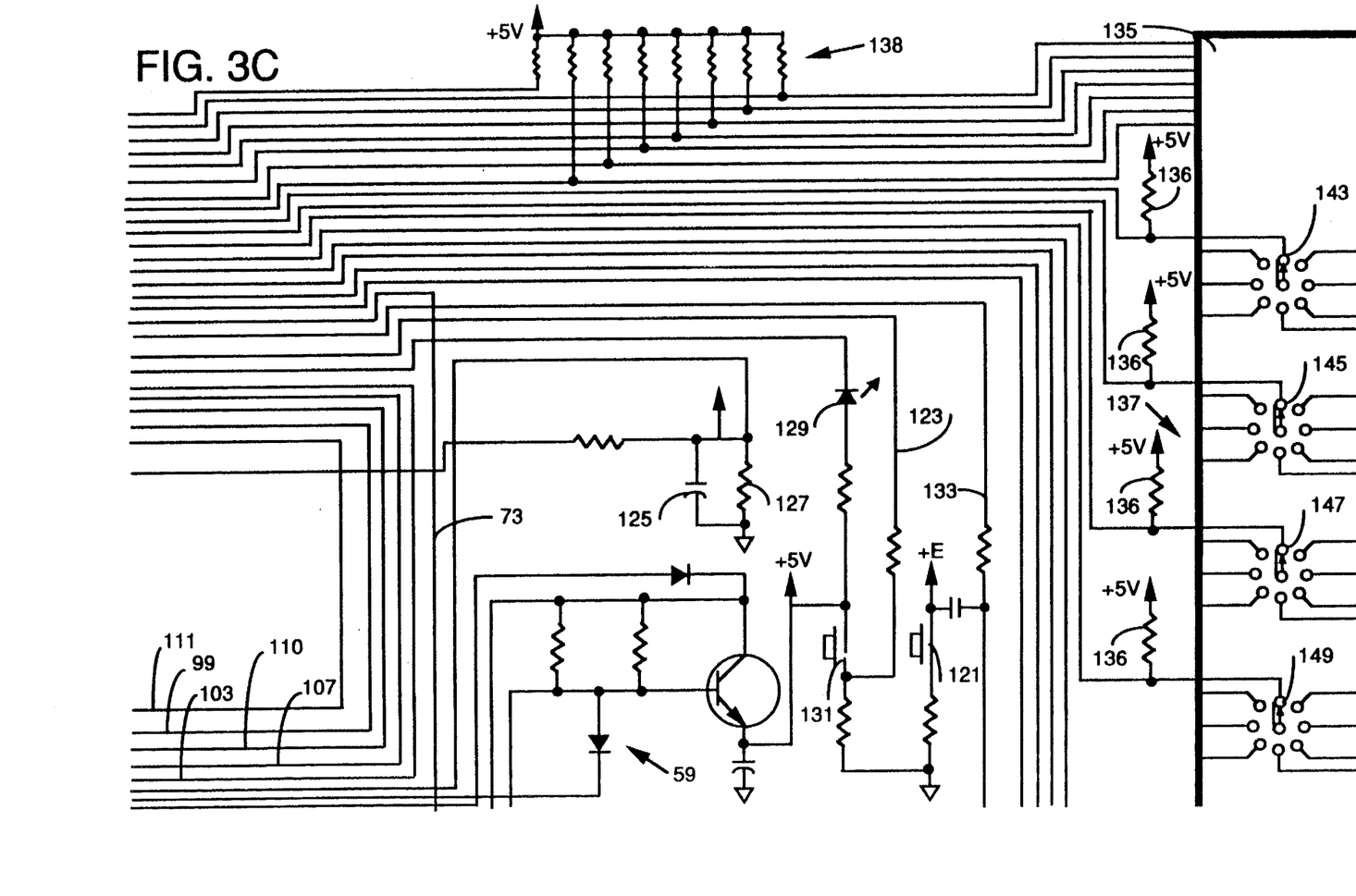
Figure 3D:
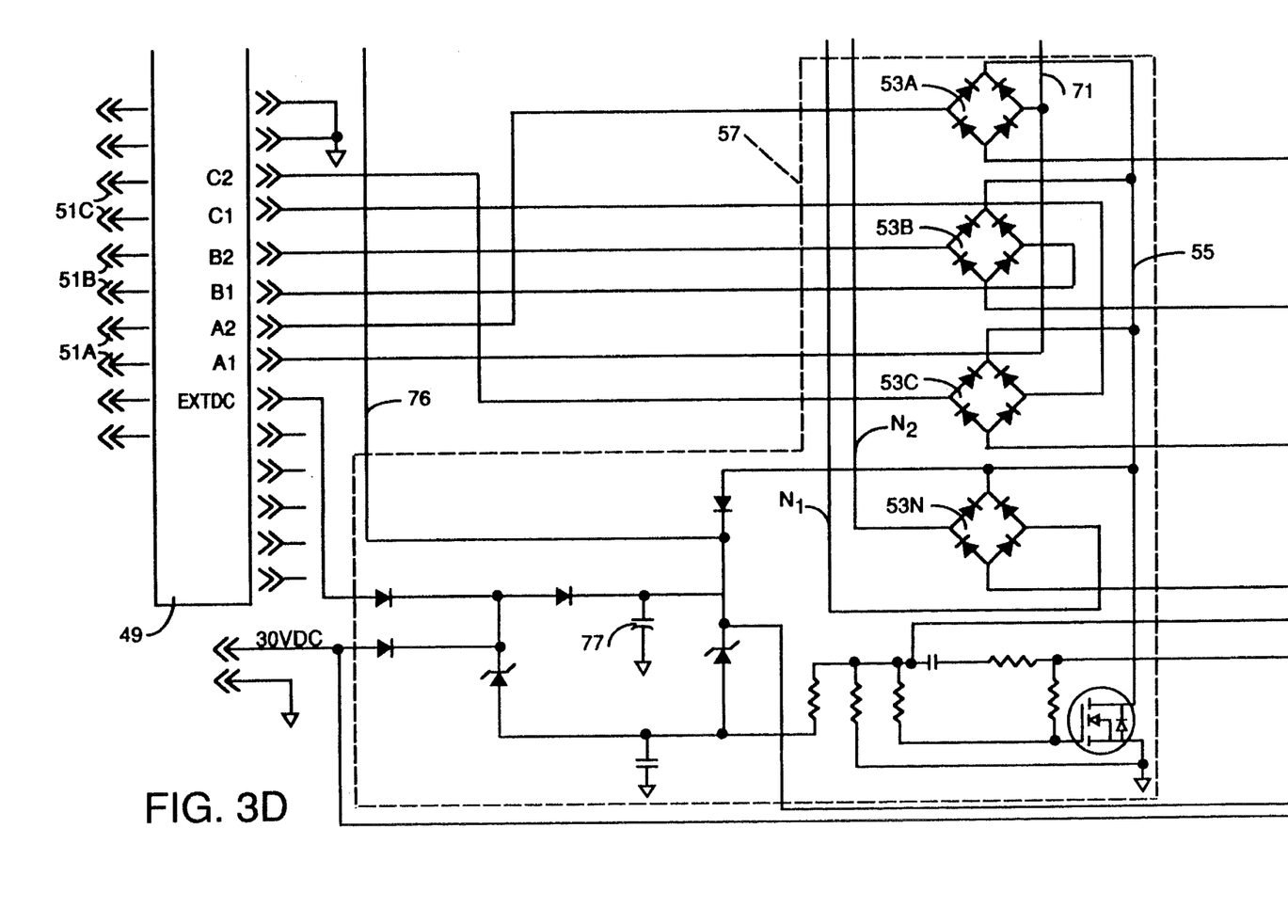
Figure 3E:
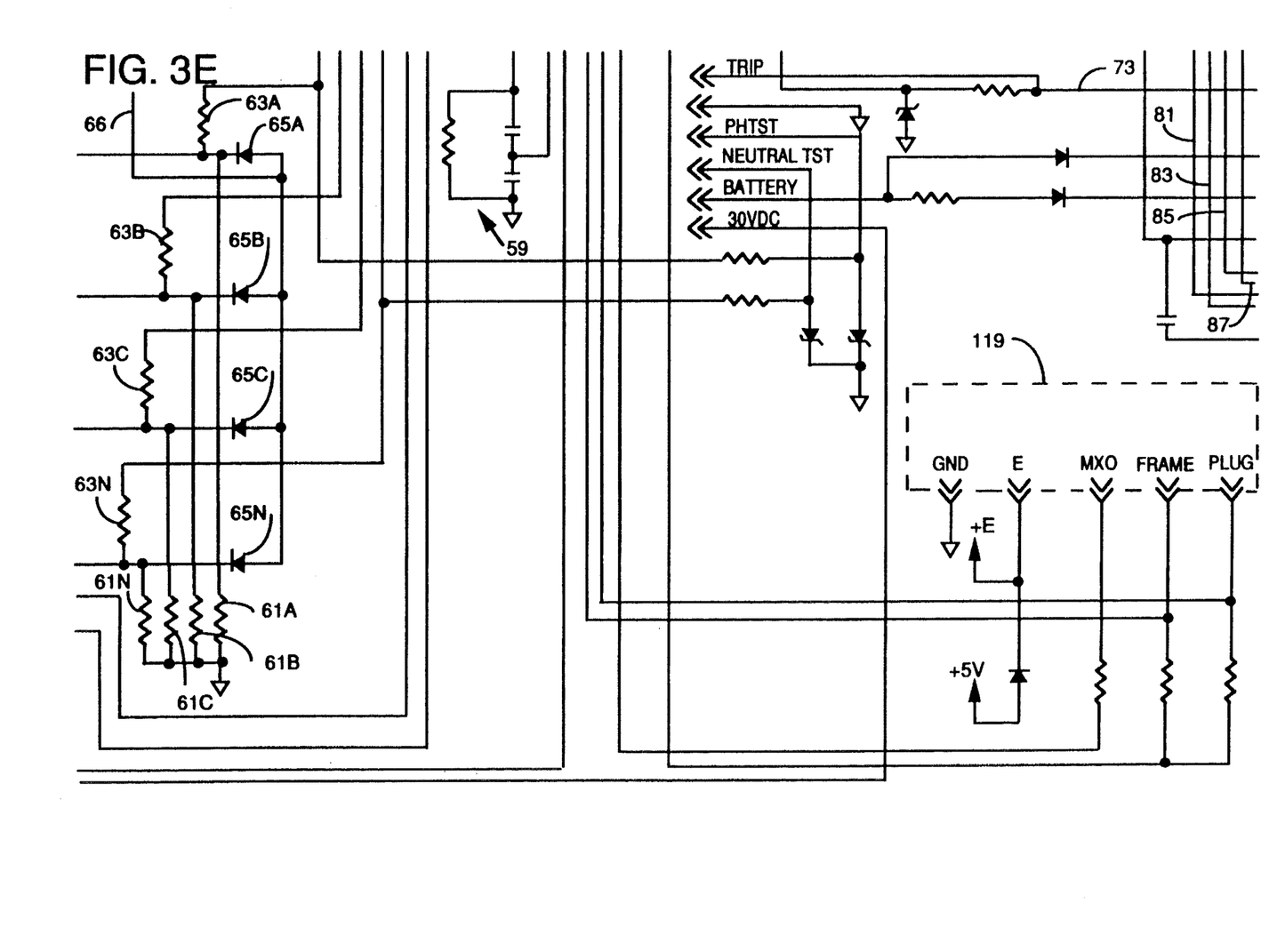
Figure 3F:
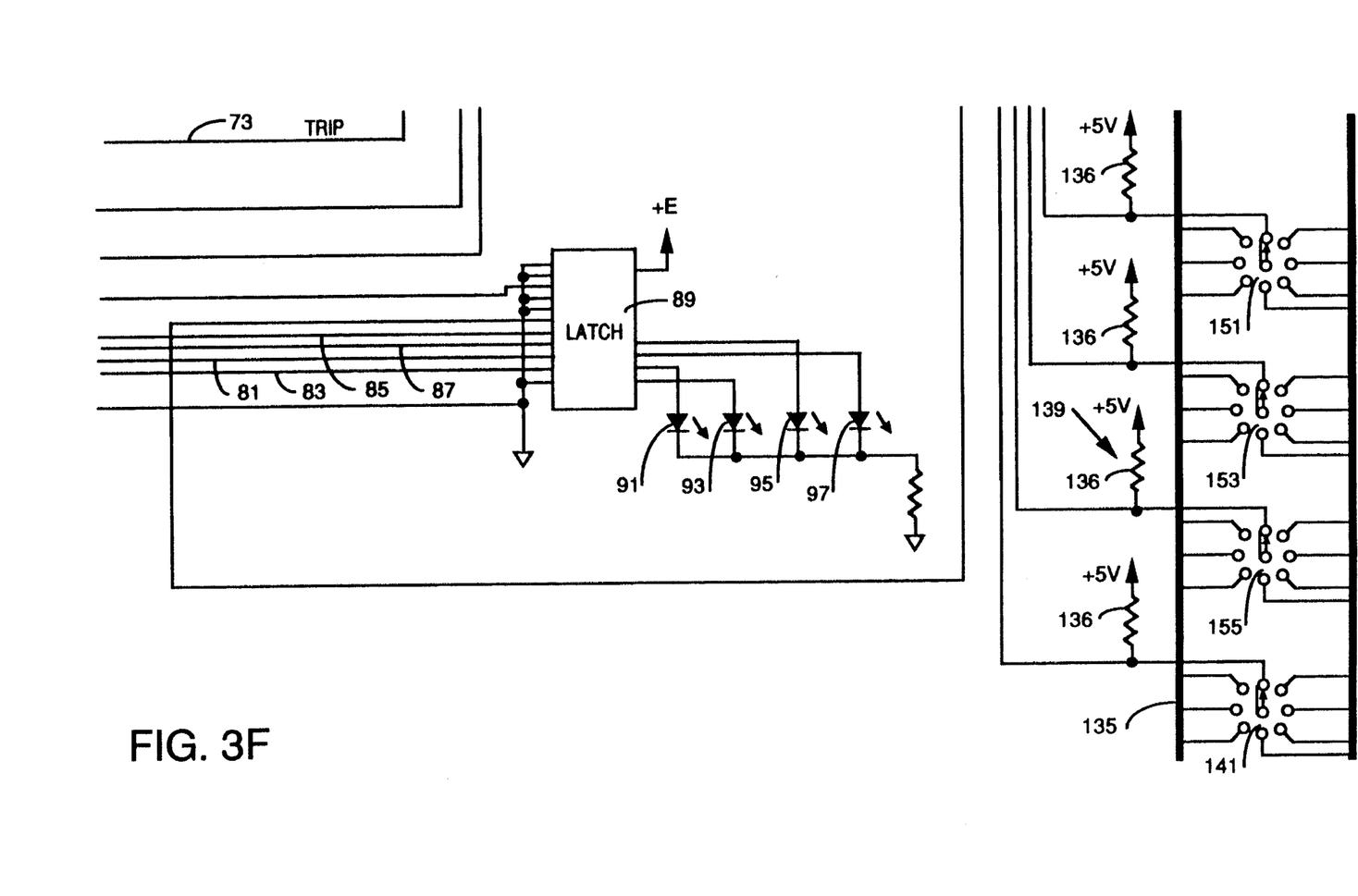

FIGS. 3A–3F when aligned as illustrated in FIG. 3 illustrate a schematic circuit diagram of the digital trip unit 15 of the circuit breaker 1. The heart of the digital trip unit is an integrated circuit (IC) chip 47. This custom chip is a complementary metal oxide semiconductor (CMOS) IC which includes an on-board microprocessor, an analog-to-digital (A/D) subsystem and various input/output devices on a single monolithic chip. The details of this chip are disclosed in U.S. Pat. No. 5,270,898 issued on Dec. 14, 1993 which is hereby incorporated by reference. The IC described in this patent includes circuitry for communication through leads 48 protected by surge protection circuits 50 between the circuit breaker and remote devices (not shown) for remote control and monitoring. While such communications are compatible with the present invention they are not a necessary part of a circuit breaker in accordance with the invention, and hence will not be discussed herein.

The digital trip unit 15 includes an extender board 49 which plugs into the housing of the circuit breaker for inputting and outputting signals to the digital trip unit. The extender board 49 includes pairs of connections 51A, B, C, N for inputting phase currents and neutral currents from the secondary CT's 11A, B, C, N. respectively. These phase and neutral current signals are converted to dc signals by full wave rectifiers 53A, B, C, N. The dc outputs of the full wave rectifier bridges 53 are applied to a common lead 55 which supplies current to a power supply 57. The power supply 57 provides a roughly regulated voltage for powering the digital trip unit 15. Thus, the digital trip unit is energized by the currents in the protected electrical system. Additional circuits 59 connected to the IC 47 provide a reference voltage and 5 volt regulated supply for use by the IC and other circuits in the digital trip unit 15.

The dc currents produced by the full wave rectifiers 53A, B, C, N are applied to current sensing resistors 61A, B, C, N, respectively. The sensed currents, are read into the IC chip 47 through input resistors 63A, B, C, N. As explained in the referenced patent, these currents are converted to voltages by the analog circuits in the IC 47 and digitized by the on-board A/D converter for input to the microproccessor The analog dc currents from the full wave rectifier bridges 53 are also auctioneered through the diodes 65A, B, C, N. If the largest analog current exceeds a value determined by the zener diode 67 to which these diodes are connected by a lead 66, an override trip signal is generated at the output terminals 68. This override signal trips the circuit breaker instantaneously to avoid the delays that are inherent in the digital circuitry in detecting and responding to overcurrent conditions. It only responds to very large overcurrents such as would be caused by a bolted short circuit. The override trip is reported to the microprocessor through the lead 69.

The phase A ac current is also applied to the IC 47 as the signal SIGNIA over lead 71 to provide an indication of the sign of the current and is used by the microprocessor in determining the frequency of the currents in the protected system.

The microprocessor incorporated in the IC 47 uses the current signals representative of the phase and neutral currents to provide instantaneous, short delay and long delay protection in accordance with the protection curves discussed in connection with FIG. 2. As mentioned, the protection for the neutral conductor is separately adjustable from the phase protection in a manner to be discussed below.

When the overcurrent-time limits are exceeded, the microprocessor on the IC generates a TRIP signal on lead 73. This trip signal turns on a FET 75 which provides a ground for discharge through a lead 76 of a capacitor 77 in the power supply 57 to actuate the flux shunt trip device 17 connected to the connection 79 on the extender board 49 which in turn opens the contacts 19. A fly back diode 78 is provided across the shunt trip device. The microprocessor also generates signals INST, SHORT, NEUTRAL, and LONG on leads 81, 83, 85 and 87, respectively. These signals are latched by a latch 89 for energization of INST, SHORT, and LONG. LEDs 91, 93, 95 and 97 which provide a visual indication of the cause of trip. If the trip was caused by an overcurrent in one of the phase conductors, one of the LEDs 91, 93, or 97 will be energized. If the overcurrent occurred in the neutral conductor, the neutral LED 95 will be energized as well as one of the LD, SD or INST LEDs to indicate the type of neutral trip.

The microprocessor also generates alarm signals which provide notice of a condition which could lead to a trip. Thus, an LDALARM signal is generated on the lead 99 if the circuit breaker has tripped on a long delay. This signal is provided at a connection 101 on the extender board 49 for turning on an indicator on the front panel of the circuit breaker, and a remote alarm if desired. The microprocessor generates a HLALARM signal on a lead 103 when a current reaches a percentage for instance 85%, of the pick-up value for a long delay trip. This signal is provided to the HILOAD ALARM connection 105 on the extender board 49. The microprocessor also generates an SCALARM signal on a lead 107 as a short circuit alarm indicating that an instantaneous trip has been generated. This signal is provided to the SHCK ALRM connection 109 on the extender board. A NEUTRAL ALARM signal is generated on the lead 110 when an operator selectable neutral current high threshold level, which is less than the pick-up current for neutral long delay protection is exceeded. Alternatively, the neutral alarm can be generated when any of the neutral protection pick-up values are exceeded. This signal is available at the output 112 on the extender board. The zener diodes 114 protect the IC 47 from any surges from circuits connected to the alarm outputs.

The digital trip unit 15 also can provide zone interlocking as is known in the art. Zone interlocking is provided in connection with the short delay protection in order to coordinate tripping of upstream and down stream circuit breakers in a manner which is well known. The short delay zone interlock out signal is provided by the microprocessor on lead 111 connected to the extender board 49 at the SOUT X connection 113. The short delay zone interlock input signal is input on lead 115 to the microprocessor from the SINX connection 117 on the extender board 49.

The digital trip unit 15 can be used with various frame sizes of circuit breakers. In addition, each of the frame sizes of circuit breakers with which the digital trip unit 15 is compatible can be used to protect an electrical system 3 in which the maximum continuous current permitted is less than or equal to the maximum continuous current permitted by the frame. In order to provide this information to the digital trip unit 15, a suitable, removable rating plug 119 can be plugged into the digital trip unit. The rating plug 119 contains a number of resistors (not shown) which are keyed to the frame size, and which set the maximum or rated current for the particular installation. This rated current can be the maximum current allowed by the frame size or some smaller value. For instance, if the maximum current allowed by the frame is 2,000 amperes, the resistor combination in the plug 119 can be selected to indicate to the microprocessor that the rated current is 2,000 amperes, 1,500 amperes, 1,200 amperes, or any other value less than 2,000 amperes. The microprocessor reads the FRAME setting through a dedicated input MUX5 and the MXO input of the multiplexor on the IC 47 and reads the rated current through the MXO and dedicated input MUX6.

The rating plug 119 also contains a battery (not shown) which provides a 5 volt source of power +E. As indicated previously, the digital trip unit 15 is powered by current from the protected circuit. When the circuit breaker trips and the current is interrupted, the power to the microprocessor is also interrupted. The five volt dc power +E provided by the battery on the rating plug 119 is applied to the latch 89 so that the cause of trip LEDs 91, 93, 95, and 97 remain energized following a trip. This battery is also used to provide, through the connection +E, power for a reset button 121 which generates a TRIP reset signal for the microprocessor on lead 123.

When the power to the microprocessor is lost upon tripping of the circuit breaker, the calculation of the thermal state of the load represented by the $I^2t$ characteristic maintained by the long delay trip function is also lost. As is known in the art, the voltage representative of the thermal excitation state of the load, as represented by the $I^2t$ value, is stored on an external capacitor 125. In the exemplary digital trip unit 15, the capacitor 125 continuously tracks the thermal excitation state signal generated by the microprocessor. When the circuit breaker trips, and the microprocessor becomes unpowered, the capacitor 125 discharges through a resistor 127. The value of resistor 127 is selected so that the voltage on the capacitor 125 discharges at a rate which mimics cooling of the load. When the microprocessor becomes repowered, it utilizes the residual voltage on the capacitor 125 to set an initial value for the continued calculation of the thermal excitation state of the load.

A status LED 129 is energized intermittently by the microprocessor to provide a status indication that the microprocessor is operational. The digital trip unit 15 can be tested by momentarily depressing a test button 131. This provides a TEST input to the microprocessor on lead 133.

The settings for the various protection functions are input to the microprocessor through a data bus 135. Connected to the data bus is a first set of operator adjustable switches 137 for adjusting the parameters for phase protection a second set of switches 139 for setting neutral protection, and a switch 141 for setting the test parameters. The first set of switches 137 for setting phase protection includes: a switch 143 for setting the long delay pick-up level for phase protection, a switch 145 for setting the long delay time, a switch 147 for setting the short delay pick-up level for phase protection, a switch 149 for setting the short delay time, and a switch 151 for setting the instantaneous pick-up level.

The second set of switches 139 includes a switch 153 for setting the long delay pick-up level for neutral protection, and switch 155 for setting the threshold level for the neutral high load alarm. Each of the switches 141–155 has eight selectable settings. The settings of the switches 141–155 are read by the IC 47 through the data bus 135. The IC ports PB0–PB7 determine which switch is to be read. The port connected to the switch to be read is set to ground so that the wiper of that switch is grounded. The ports connected to the remaining switches are set to a high impedance so that the wipers of those switches are pulled up to +5 volts by the associated pull-up resistor 136. The ports PD1–PD7 read in the wiper position of the interrogated switch in parallel. The terminal engaged by the wiper will be at ground. All of the remaining terminals on the interrogated switch are pulled-up to +5 volts by the associated resistors 138.

Figure 4:
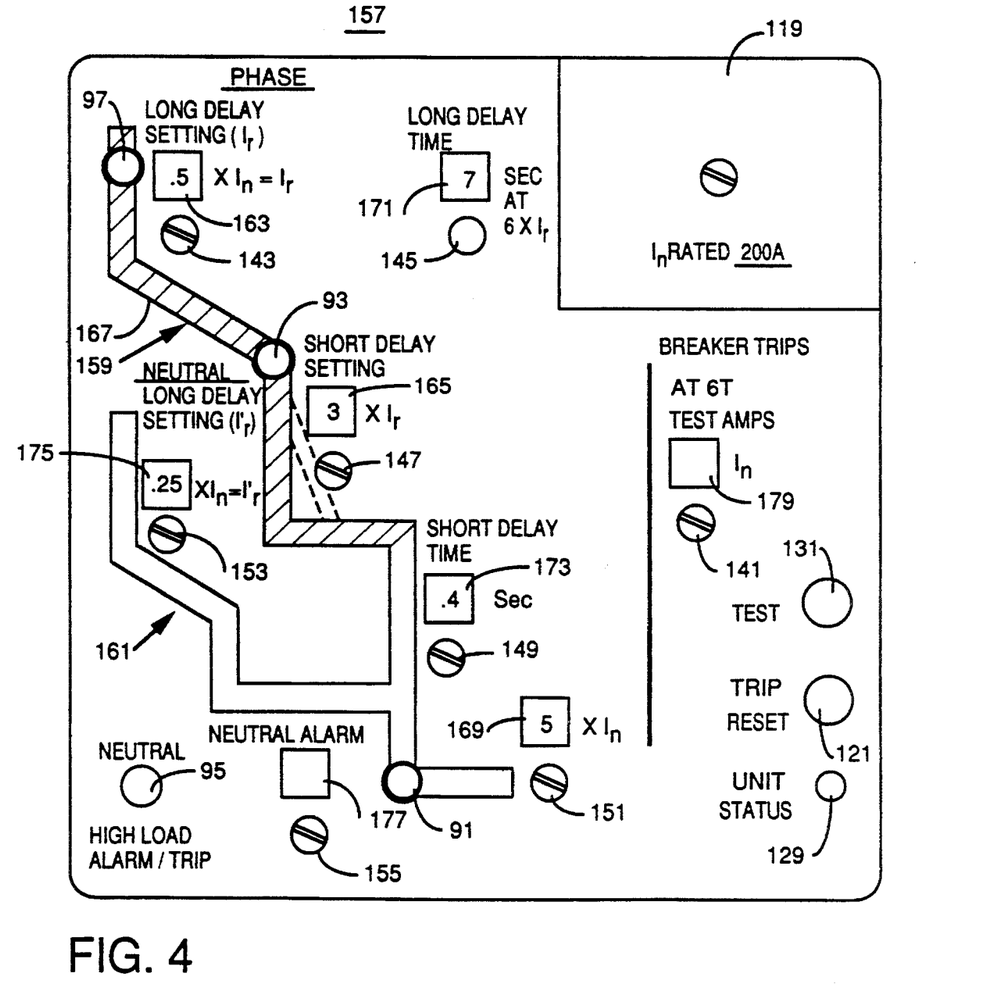
FIG. 4 is an illustration of an operator's panel which form part of the trip unit of FIGS. 3A–3F.

FIG. 4 illustrates the operator panel 157 for the digital trip unit 15. The operator's panel 157 includes a graphical representation 159 of the phase current-time characteristic and a representation of the neutral current-time characteristic 161. The switches 143, 147 and 151 for setting the phase long delay, short delay and instantaneous pick-up values, respectively, are mounted on the operator's panel adjacent the associated portion of the phase current-time characteristic 159. The switch 145 for setting the long delay time, and the switch 149 for setting the short delay time are also located appropriately next to the phase curve 159. The long delay pick-up setting is displayed in a window 163 next to the switch 143 and adjacent to the window is a legend indicating that it displays the phase long delay setting. It also indicates that the long delay setting $I_t$ is equal to the setting in the window multiplied by $I_n$ which is the rated current set by the rating plug. This factor which sets the long delay pick-up level can only be a fraction. Similarly, a window 165 displays the short delay pick-up setting which is a multiple of the long delay pick-up value $I_r$. Thus, when the long delay pick-up setting is adjusted, the short delay pick-up level is adjusted with it. This feature is disclosed in commonly owned patent application Ser. No. 092,294 filed on Jul. 15, 1993. A distinguishing color 167 is used on this portion of the curve 159 to indicate this dependency. The instantaneous trip pick-up setting is displayed in a window 169 adjacent to switch 151. As indicated, the instantaneous pick-up level is a multiple of the rated current, $I_n$, set by the rating plug 119. The long delay time setting is displayed in the window 171 while the short delay time is displayed in the window 173. The legend next to the long delay time window 171 indicates that the circuit breaker will trip after the displayed time in seconds with the phase current at six times the long delay pick-up level $I_r$ as discussed previously. The INST, SHORT, and LONG LEDs, 91, 93 and 97 are mounted in the operator's panel at the appropriate location in the graphical representation 159 of the phase protection curve.

The switch 153 for setting the neutral long delay pick-up value is similarly located adjacent to the upper portion of the graphic representation 161 of the neutral protection curve on the operator's panel 157. Just above the switch 153 is the neutral setting window 175 in which the neutral long delay pick-up setting is displayed. While this switch is labeled "neutral long delay setting", it is really a neutral conversion factor that affects all the neutral settings, including instantaneous. An example of values for the neutral long delay setting would be eight values from 0.25 to 2.0 in increments of 0.25. As indicated by the legend on the operator's panel, the neutral long delay pick-up value $I_r$ is equal to the selected factor times $I_n$, the rated current set by the rating plug 119.

The switch 155 for establishing the neutral high load alarm setting is also placed on the operator's panel, adjacent the representation 161 of the neutral protection curve. The settings of the neutral high load alarm are displayed in the window 177 directly above the switch 155. In addition, the neutral LED 95 which will be illuminated in response to a neutral trip and which flashes in response to a high load alarm is also located next to the neutral protection curve 161.

The test switch 141 which sets the pick-up value for testing is also displayed in the lower right hand corner of the operator's panel 157. Immediately above the switch 141 is a window 179 displaying the test pick-up setting. The adjacent legend recites the conditions for test trip. Below the test set switch 141 are the test button 131 the reset switch 121 and the status LED 129. The rating plug 119 is mounted in the upper right hand corner of the operator's panel 157.

Figure 5:
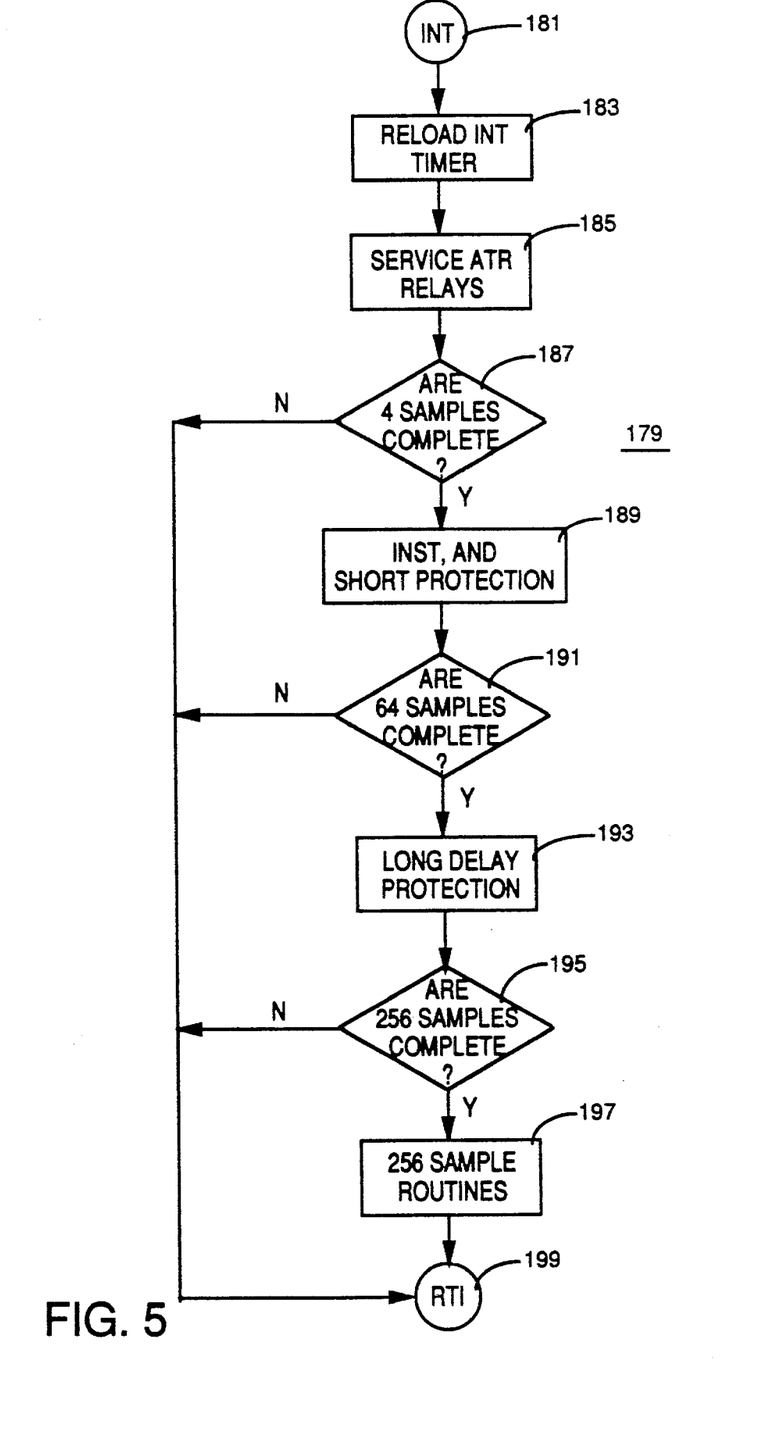
FIG. 5 is a flow chart of a suitable computer program utilized by the trip unit of FIGS. 3A–3F to implement the invention.

FIG. 5 illustrates the flow chart of the interrupt protection routine implemented by the microprocessor on the IC 47. This interrupt protection routine 179 is called at 181 approximately every 4 milliseconds, or four times per cycle. Upon being called, the routine first sets the timer at 183 to implement the next interrupt, and then services the ATR relays such as the neutral alarm relay 21 at 185. Each time four samples have been completed, as determined at 187, the instantaneous and short delay protection calculations are made at 189. After each 64 samples, as determined at 191, long delay protection is calculated at 193. Every 256 samples, as determined at 195, other related routines such as calculation of energy and power are implemented at 197. In each case, the routine returns at 199 to the calling routine.

Figure 6:
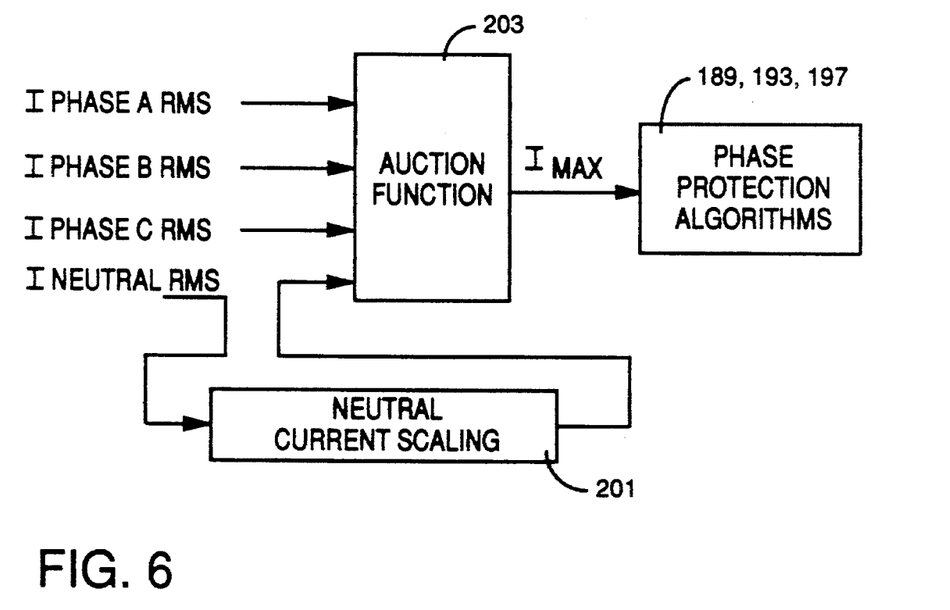
FIG. 6 is a flow chart of a subroutine used by the computer program charted in FIG. 5.

FIG. 6 illustrates a subroutine used by the routine 179 for integrating the phase and neutral protection. The samples accumulated for each of the phase currents and neutral current are processed to generate RMS current values as is known. The neutral current is then scaled at 201. For long and short delay protection, this scaling is implemented by multiplying the neutral current by the ratio of the phase long delay pick-up setting to the neutral long delay pick-up setting. Since phase instantaneous protection is a function of the rated current $I_n$ and not $I_r$, the neutral current is multiplied by 1 over the neutral long delay setting to scale it for auctioneering with the phase currents for instantaneous protection. The scaled RMS neutral current is then auctioneered with the phase RMS currents at 203 with the current of highest amplitude, $I_{max}$, being supplied to the phase protection algorithms at 189, 193 and 197 in FIG. 5.

The present invention allows a circuit breaker to be used in installations with varying sizes of neutral conductors through operator selection of a neutral protection scaling factor on the front face of the trip unit. This is a useful feature for many installations such as where the use of many personal computers and other electronic equipment with single phase power supplies which increase the currents on the neutral conductor have increased the need to provide adequate neutral protection.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. An electric circuit interrupting device in an electrical system having three phase conductors and a neutral conductor, said device comprising:
    separable contact means for interrupting current flowing in said electrical system;
    current sensing means sensing current flowing in each of said phase conductors and in said neutral conductor;
    trip signal generating means connected to said current sensing means and responsive to first operator adjustable current conditions in any of said three phase conductors and to second operator adjustable current conditions in said neutral conductor, for generating a trip signal; and
    trip means responsive to said trip signal for opening said separable contact means to interrupt current flowing in said electrical system.

2. The electric circuit interrupting device of claim 1 wherein said trip signal generating means comprises first operator adjustable setting means for setting said first operator adjustable current conditions to a plurality of current conditions in said phase conductors and second operator adjustable setting means for setting said second operator adjustable current conditions to a plurality of current conditions in said neutral conductor.

3. The circuit interrupting device of claim 2 wherein said second operator adjustable setting means sets said second operator adjustable current conditions as an operator adjustable function of said first operator adjustable current conditions.

4. The circuit interrupting device of claim 2 wherein said first operator adjustable setting means comprises means for setting said plurality of current conditions sensed in said phase conductors for generation by said trip signal generating means of at least one of phase current long delay, short delay and instantaneous trip signals, and said second operator adjustable setting means comprises means for setting said plurality of current conditions sensed in said neutral conductor for generation by said trip signal generating means of at least one of neutral current long delay, short delay and instantaneous trip signals.

5. The circuit interrupting device of claim 4 wherein said first operator adjustable setting means comprises means setting phase current pick-up values and delay times for generation by said trip signal generating means of said at least one of phase current long delay, short delay and instantaneous trip signals, and wherein said second operator adjustable setting means comprises means setting neutral current pick-up values for generation by said trip signal generating means of said at least one of neutral current long delay, short delay and instantaneous trip signals using said delay times set by said first operator adjustable setting means.

6. The circuit interrupting device of claim 5 wherein said second operator adjustable setting means comprises means setting said neutral current pick-up values as a percentage of said phase current pick-up values set by said first operator adjustable setting means.

7. The circuit interrupting device of claim 6 wherein said trip signal generating means further comprises means setting a frame rated current and wherein said first operator adjustable setting means comprises means setting said phase current pick-up values as a first factor times said frame rated current and wherein said second operator adjustable means comprises means setting said neutral current pick-up values as a second factor times said frame rated current.

8. The circuit interrupting device of claim 2 wherein said trip signal generating means further comprises means generating a neutral current alarm when said neutral current exceeds a selected threshold level.

9. The circuit interrupting device of claim 8 wherein said second operator adjustable setting means further comprises means for adjustably setting said selected threshold level independently of said plurality of current conditions in said neutral conductor.

10. The circuit interrupting device of claim 1 wherein said trip signal generating means further comprises means setting a frame rated current for said device and operator adjustable means for setting said first operator adjustable current conditions in said phase conductors as a first factor times said frame rated current.

11. The circuit interrupting device of claim 10 wherein said operator adjustable means further comprises means setting said second operator adjustable current conditions in said phase conductors as a second factor times said frame rated current.

12. The circuit interrupting device of claim 1 wherein said trip signal generating means comprises means setting said second operator adjustable current conditions for generation of a trip signal when current in said neutral conductor exceeds an adjustable pick-up level of neutral current for a selected period of time, and means for generating a neutral current overload alarm indication when current in said neutral conductor exceeds a threshold level which is less than said pick-up level.

13. An electric current interrupting device in an electrical system having three phase conductors and a neutral conductor, said device comprising:
    separable contact means for interrupting current flowing in said electrical system;
    current sensing means sensing current flowing in each of said phase conductors and in said neutral conductor;
    trip signal generating means comprising means setting a rated current for said device, first operator adjustable means setting first operator adjustable current levels in said phase conductors as a first factor times said rated current, second operator adjustable means setting second operator adjustable current in said neutral conductor as a second factor times said rated current, means scaling said current sensed in said neutral conductor by the ratio of said first factor to said second factor generate a scaled neutral current, means for auctioneering sensed current in each phase with said scaled neutral current to select a maximum current, and means generating a trip signal as a function of selected current-time characteristics using said maximum current, and
    trip means responsive to said trip signal for opening said separable contacts to interrupt current flowing in said electrical system.

* * * * *